United States Patent
Kim et al.

(10) Patent No.: US 12,190,653 B2
(45) Date of Patent: Jan. 7, 2025

(54) AUTOMATED DETECTION OF VEHICLE DATA MANIPULATION AND MECHANICAL FAILURE

(71) Applicant: Ford Global Technologies, LLC, Dearborn, MI (US)

(72) Inventors: Yu Seung Kim, San Jose, CA (US); Chun-Yu Chen, Ann Arbor, MI (US); Kang Shin, Ann Arbor, MI (US)

(73) Assignees: Ford Global Technologies, LLC, Dearborn, MI (US); Regents of the University of Michigan, Ann Arbor, MI (US)

( * ) Notice: Subject to any disclaimer, the term of this patent is extended or adjusted under 35 U.S.C. 154(b) by 607 days.

(21) Appl. No.: 17/064,417

(22) Filed: Oct. 6, 2020

(65) Prior Publication Data
US 2022/0108569 A1  Apr. 7, 2022

(51) Int. Cl.
*G07C 5/00* (2006.01)
*B60R 16/023* (2006.01)
(Continued)

(52) U.S. Cl.
CPC ........ *G07C 5/0808* (2013.01); *B60R 16/0231* (2013.01); *B60W 50/0205* (2013.01); *B60W 2510/0638* (2013.01); *B60W 2520/10* (2013.01); *B60W 2520/12* (2013.01); *B60W 2520/14* (2013.01); *B60W 2540/10* (2013.01);
(Continued)

(58) Field of Classification Search
CPC ............. G07C 5/0808; B60R 16/0231; B60W 50/0205; B60W 2510/0638; B60W 2520/10; B60W 2520/12; B60W 2520/14; B60W 2540/10; B60W 2540/12; B60W 2540/16; B60W 2540/18; B60W 2050/0215; B60W 2510/1005; B60W 2520/105; B60W 2520/125; B60W 2050/021
See application file for complete search history.

(56) References Cited

U.S. PATENT DOCUMENTS 8,478,514 B2  7/2013  Kargupta
9,792,435 B2  10/2017  Harris et al.
(Continued)

FOREIGN PATENT DOCUMENTS

WO   WO-2012079685 A1 *  6/2012  ......... G05B 23/0235

OTHER PUBLICATIONS

"Car Dog: What's Wrong with My Car?" (n.d.), Anonymous submission #59 to ACM CCS (Conference on Computer and Communications Security) 2019, 13 pages.

*Primary Examiner* — Tiffany P Young
(74) *Attorney, Agent, or Firm* — Christopher Storms; Kilpatrick Townsend & Stockton LLP

(57) ABSTRACT

Disclosed are systems and methods to detect and identify vehicular anomalies. Techniques to detect and identify the vehicular anomalies include receiving signals from various sensors, grouping the signals into detection sets, detecting anomalies by a comparison to vehicle behavior models, and cross-referencing the detection sets with each other to narrow down and identify the source of the anomaly. The detection sets may be grouped such that facets of vehicle maneuverability are captured and cover causal relations between different maneuverability mechanisms.

16 Claims, 9 Drawing Sheets

(51) Int. Cl.
 *B60W 50/02* (2012.01)
 *G07C 5/08* (2006.01)
(52) U.S. Cl.
 CPC ..... *B60W 2540/12* (2013.01); *B60W 2540/16* (2013.01); *B60W 2540/18* (2013.01)

(56) References Cited

U.S. PATENT DOCUMENTS

| | | | |
|---|---|---|---|
| 10,249,109 B1* | 4/2019 | Konrardy | G06F 30/15 |
| 10,298,612 B2 | 5/2019 | Galula et al. | |
| 10,382,466 B2 | 8/2019 | Ostergaard | |
| 2008/0255721 A1 | 10/2008 | Yamada | |
| 2010/0305806 A1 | 12/2010 | Hawley | |
| 2012/0303348 A1* | 11/2012 | Lu | G06F 11/079 |
| | | | 703/13 |
| 2015/0105933 A1* | 4/2015 | Martin | G07C 5/0866 |
| | | | 701/1 |
| 2018/0196941 A1 | 7/2018 | Ruvio et al. | |
| 2019/0236865 A1* | 8/2019 | Mercep | B60W 50/0225 |
| 2019/0378351 A1* | 12/2019 | Dorenkamp | G07C 5/0816 |
| 2020/0207362 A1* | 7/2020 | Nishida | B60W 50/032 |
| 2021/0335061 A1* | 10/2021 | Claessens | G07C 5/0816 |
| 2022/0068051 A1* | 3/2022 | Krishnamurthy | G07C 5/006 |
| 2022/0126864 A1* | 4/2022 | Moustafa | G08G 1/096775 |

* cited by examiner

| Index | Type | gas | brake | $\theta_s$ | rpm | gear | ax | ay | az | v |
|---|---|---|---|---|---|---|---|---|---|---|
| 1* | CI×DYN | ✓ | ✓ | | | | ✓ | | | ✓ |
| 2 | CI×DYN | ✓ | | | | | ✓ | | | ✓ |
| 3 | CI×DYN | | ✓ | | | | ✓ | | | ✓ |
| 4* | PC×DYN | | | | ✓ | ✓ | | | | ✓ |
| 5 | PC×DYN | | | | ✓ | | | | | ✓ |
| 6 | PC×DYN | | | | | ✓ | | | | ✓ |
| 7 | CI×PC | ✓ | ✓ | | ✓ | | | | | |
| 8 | CI×PC | ✓ | ✓ | | | ✓ | | | | |
| 9 | CI×PC×DYN | ✓ | | | | ✓ | | | | ✓ |
| 10* | CI×DYN | | | ✓ | | | | ✓ | | ✓ |
| 11* | CI×DYN | | | ✓ | | | | | ✓ | ✓ |
| 12 | DYN×DYN | | | | | | | ✓ | ✓ | ✓ |

FIG. 3

| | DS | Result | Gas | Brake | $\theta_S$ | RPM | Gear | $a_X$ | $a_Y$ | $\omega_Z$ | $v$ |
|---|---|---|---|---|---|---|---|---|---|---|---|
| 501 | $DS_1$ | ✓ | 1 | 1 | - | - | - | 1 | - | - | 1 |
| 502 | $DS_4$ | ✗ | - | - | - | 0 | 0 | - | - | - | 0 |
| 503 | $DS_{10}$ | ✓ | - | - | 1 | - | - | - | 1 | - | 1 |
| 504 | $DS_{11}$ | ✓ | - | - | 1 | - | - | - | - | 1 | 1 |
| 505 | $DS_5$ | ✓ | - | - | - | 1 | - | - | - | - | 1 |
| 506 | $DS_6$ | ✗ | - | - | - | - | 0 | - | - | - | 0 |
| 507 | $DS_7$ | ✓ | 1 | 1 | - | 1 | - | - | - | - | - |
| 508 | $DS_8$ | ✗ | 0 | 0 | - | - | 0 | - | - | - | - |
| 509 | $DS_9$ | ✗ | 0 | - | - | - | 0 | - | - | - | 0 |
| 510 | All | ✗ | 1 | 1 | 1 | 1 | 0 | 1 | 1 | 1 | 1 |

```
┌─────────────────────────────────────────────────────────────────────┐
│ Receive a plurality of signals from a plurality of sensors, each signal of the plurality of │
│                   signals containing vehicular data                 │
│                                                                     │
│                                 602                                 │
└─────────────────────────────────────────────────────────────────────┘
                                     ↓
┌─────────────────────────────────────────────────────────────────────┐
│ Group the plurality of signals into a plurality of detection sets, wherein each signal of │
│   the plurality of signals is included in at least one detection set of the plurality of │
│                             detection sets                          │
│                                                                     │
│                                 604                                 │
└─────────────────────────────────────────────────────────────────────┘
                                     ↓
┌─────────────────────────────────────────────────────────────────────┐
│  Detect an anomaly within at least one detection set of the plurality of detection sets │
│ based on a comparison of signals in the at least one detection set to a normal behavior │
│                                  model                              │
│                                                                     │
│                                 606                                 │
└─────────────────────────────────────────────────────────────────────┘
                                     ↓
┌─────────────────────────────────────────────────────────────────────┐
│ Cross referencing the at least one detection set with at least one other detection set of │
│       the plurality of detection sets to identify a source of the anomaly.        │
│                                                                     │
│                                 608                                 │
└─────────────────────────────────────────────────────────────────────┘
```

FIG. 6

AUTOMATED DETECTION OF VEHICLE DATA MANIPULATION AND MECHANICAL FAILURE

BACKGROUND

The increasing addition of features to vehicles increases complexity and widens the gap between consumer knowledge and mechanic knowledge, particularly when it comes to vehicle repair. The trend towards autonomous driving further wrests control and monitoring away the driver with the increase in complexity of the various vehicle components.

Self-diagnostics has been introduced to alleviate the burden on drivers in regard to vehicular repair. For example, the check engine light, oil change indicators, tire pressure gauge, and other signals to drivers that the car needs servicing or is experiencing anomalous behavior are basic forms of self-diagnostics commonly available. With modern cars, these self-diagnostic systems can be even more complex, and able to assist mechanics without requiring expert knowledge by the driver. However, the use of these more complex self-diagnostics requires more communication interfaces between the vehicle and external sources of information.

Moreover, the trend towards autonomous vehicles introduces components that may require communication interfaces with objects outside the vehicle. As a result, anomalous vehicle behavior can be attributed to component failure or manipulation of the various communication interfaces. Combined with the increasing complexity of the vehicle components, the ability to self-diagnose requires further refinement that allows for analyzing of component failure as well as protect from data manipulation.

SUMMARY

Generally, the detection and diagnosis of vehicle anomalies is described. Vehicles experiencing anomalies may occur through component failure or manipulation of data, and discerning between the two may prove difficult without an expert. A system for anomaly detection and diagnosing can compare detection sets to a model and cross-reference signals across a multitude of detection sets to pinpoint and identify both when and where an anomaly is occurring. Moreover the identification can discern between a true component failure and targeted data manipulation.

In embodiments, a system is described for detecting and diagnosing vehicle anomalies with a plurality of sensors, one or more processors, and a system memory. The system memory may contain instructions to cause the one or more processors to receive a plurality of signals from the plurality of sensors, with each signal containing vehicular data. The plurality of signals can then grouped into a plurality of detection sets, with each signal being included in at least one detection set. The system detects an anomaly within at least one detection set of the plurality of detection sets. The detection set can be cross-referenced with at least one other detection set to identify a source of the anomaly. In embodiments, the plurality of detection set can have primary detection sets and secondary detection sets. A primary detection set can be designed to capture one or more vehicle maneuver characteristics. A secondary detection set can be designed for cross-validation with the primary detection set.

In embodiments, a method is described for detecting and diagnosing vehicle anomalies. The method can include receiving a plurality of signals from a plurality of sensors, with each signal containing vehicular data. The plurality of signals can then be grouped into a plurality of detection sets, with each signal being included in at least one of the plurality of detection sets. An anomaly can be detected within the plurality of detection sets based on a comparison of the signals in the at least one detection set to a normal behavior model. The detection set can be cross-referenced with at least one other detection set of the plurality of detection sets to identify a source of the anomaly.

In embodiments, a non-transitory, computer-readable medium is described, with instructions that, upon execution by one or more processors, cause the one or more processors to receive a plurality of signals from a plurality of sensors of a vehicle, with each signal of the plurality of signals containing vehicular data. The plurality of signals can then be grouped into a plurality of detection sets based. An anomaly can be detected within at least one detection set of the plurality of detection sets. The detection set can be cross-referenced with at least one other detection set of the plurality of detection sets to identify a source of the anomaly.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 3 shows a table of grouped detection sets, according to embodiments.

FIG. 5 shows a table of cross-referenced detection sets, according to embodiments.

FIG. 6 illustrates a method for detecting and diagnosing vehicular anomalies, according to embodiments.

DETAILED DESCRIPTION

Due to the increasing complexity of vehicle design, vehicle repair can sometimes be difficult for the owners, particularly when mechanics struggle to figure out the root cause of anomalous vehicular behavior either because the description given by the owner is insufficient or incorrect or because there are several sources/reasons that can lead to similar anomalous behavior. As a result, repairs can be time-consuming and costly, particularly if unnecessary repairs are performed that do not correct the issue.

The increasing complexity of vehicles exacerbates the issue because user understanding and knowledge is a barrier to analyzing the anomalies that may arise in vehicular operation. Automated driving further distances users of vehicles from a full understanding of their vehicle. Furthermore, as more and more components become routed to various communication interfaces, such as GPS, cloud-based services, and other outlets, there are more vulnerable locations for targeted attacks, such as malicious data manipulation. The use should be aware of both component failures and targeted attacks. An anomaly may be component failure or when the vehicle is under targeted attack.

Anomaly detection and identification, particularly of vehicle maneuvering mechanisms, can use a system for comparison and cross-referencing to both detect the presence of anomalies and identify sources, verified by multi-faceted signal measurements that are compared to a behavior model having expected outcomes of a non-anomalous vehicle. Described below are systems and methods for such detection and identification of anomalies in vehicles.

Figure 1:
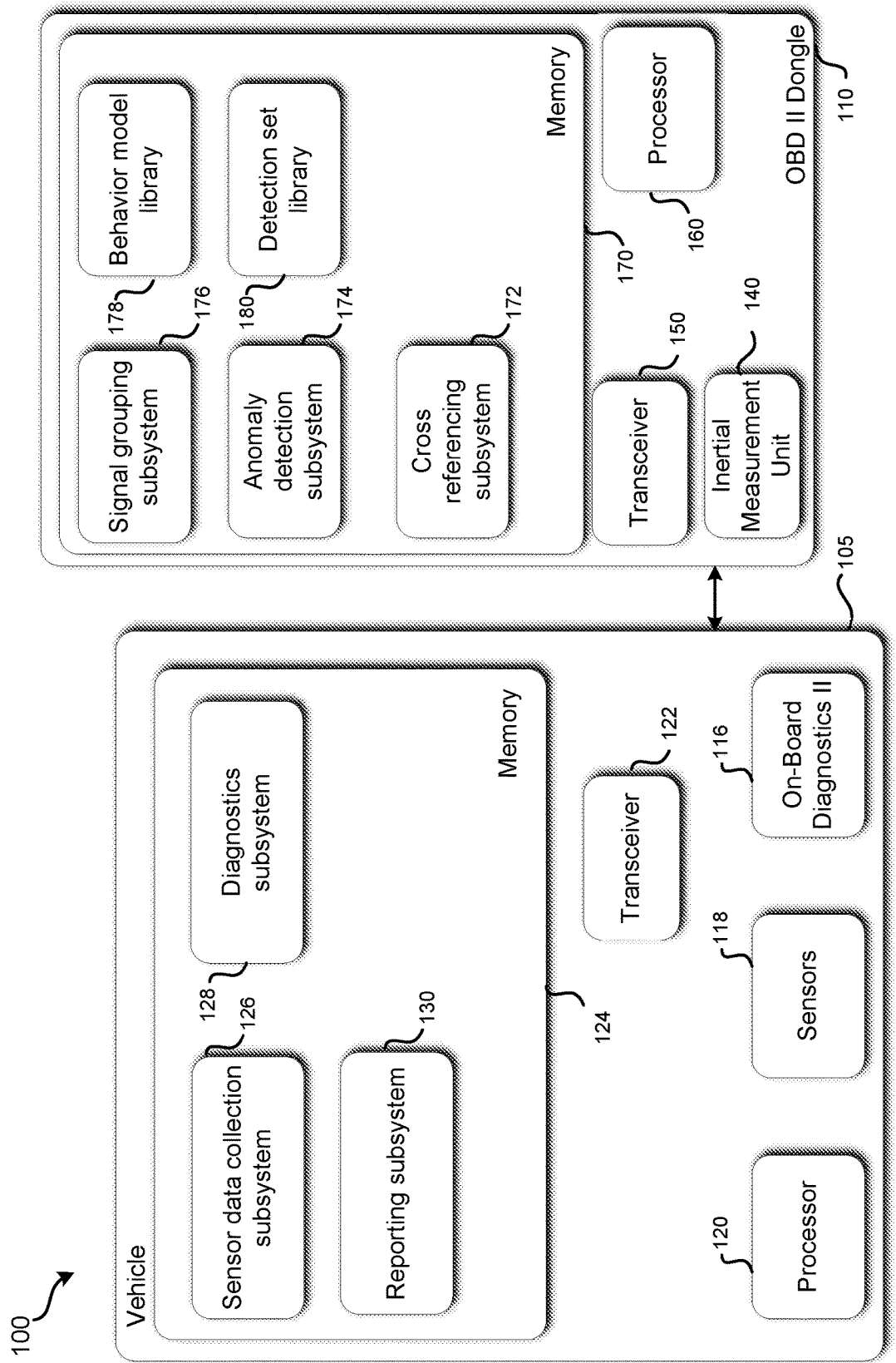
FIG. 1 illustrates an intelligence system for detecting and identifying anomalies according to embodiments.

FIG. 1 is an exemplary intelligence system 100. The intelligence system 100 includes a vehicle 105 and an on-board diagnostics II (OBD-II) dongle 110. The intelligence system 100 can be used to diagnose and detect anomalies on a vehicle, such as vehicle 105. While FIG. 1 shows an on-board diagnostics II dongle as in a communicative relation with the vehicle, the on-board diagnostics II dongle can be any suitable interface to electronically communicate with the vehicle, such as a USB, smartphone, data drive, or any other suitable computer-readable medium. In embodiments, the subset of modules and components on the OBD-II dongle 110 may be stored within the vehicle memory.

The vehicle 105 has on-board diagnostics II system 116, sensors 118, a processor 120, transceiver 122, and a memory 124. The processor 120 may execute instructions stored in the memory 124 to perform the described functionality herein. The transceiver 122 may send and receive information to and from, for example, transceiver 150 of the OBD-II dongle 110 using any suitable protocol. While only specific components of vehicle 105 are described herein, vehicle 105 may include other components, such as, for example, tires, a drivetrain, an engine, gear pedals and the like. Vehicle 105 may also include other components, subsystems, or instructions in the memory 124 that are not described herein.

The on-board diagnostics II system 116 may be a hardware interface that follows OBD-II standard specifications for vehicles. The on-board diagnostics II system 116 may allow for the vehicle 105 to monitor and report information obtained from the vehicle through sensors, such as the sensors 118. For example, the on-board diagnostics II system 116 may be communicatively coupled to a vehicle's drivetrain, engine status, tires, or any suitable region of the vehicle that may require reporting to a user.

The sensors 118 may include any sensors suitable for gathering information about the vehicle 105. For example, the sensor may relay gas pedal position, brake position, the steering wheel angle, the engine rpm, gear level, odometer reading or otherwise. Sensors 118 may communicate with the processor 120 and other components and sensors 118 via an in-vehicle network such as, for example in-vehicle network 714. The processor 120 may store the data communicated from sensors 118 in memory 124 for further processing as discussed further below.

The memory 124 has a sensor data collection subsystem 126, a diagnostics subsystem 128, and a reporting subsystem 130. While certain subsystems are described herein for ease of description, the memory 124 may include more or fewer subsystems to perform the functionality described herein.

Further, some of the data processing described may be performed on the vehicle 105 or the data may be sent to the OBD-II dongle 110 for processing, or some combination thereof. In embodiments, the data from either or both of the vehicle 105 and the OBD-II dongle 110 may be sent to a cloud server for processing and computations.

The sensor data collection subsystem 126 may collect data captured by the sensors 118. The data from the sensors 118, such as vehicle functioning data, are collected by the sensor data collection subsystem 126 and provided to the appropriate processing subsystem for processing and analysis.

The diagnostics subsystem 128 may run on-board diagnostics on data that is appropriately provided by the sensor data collection subsystem 126. As a non-limiting example, the diagnostics subsystem 128 may determine when tire pressure is too low, the engine needs an oil change, or the vehicle is due for service. The diagnostics subsystem 128 may be in electronic communication with the on-board diagnostics II system 116 in diagnosing anomalies within the vehicle.

The reporting subsystem 130 may report diagnostic errors to a user or to an interface receivable to reporting messages, such as a display screen, through a messaging medium such as email or text message, or otherwise. The reporting system 130 may determine when an anomaly is appropriate to be reported to a user.

The OBD-II dongle 110 has an inertial measurement unit (IMU) 140, a transceiver 150, a processor 160, and a memory 170. The IMU 140 may measure and report specific force, acceleration, angular rate, orientation, or any combination thereof that the IMU 140 experiences. Thus, if the IMU 140 is located within a vehicle, the IMU 140 would experience the same speed, angular change, or acceleration that the vehicle experiences. The IMU 140 may measure the mentioned measurements by accelerometers, gyroscopes, or magnetometers. The transceiver 150 may send and receive information to and from, for example, the vehicle 105 using any suitable protocol. The processor 160 may execute instructions stored in the memory 170 to perform the described functionality herein.

The memory 170 has cross-referencing subsystem 172, anomaly detection subsystem 174, signal grouping subsystem 176, behavior model library 178, and detection set library 180. While certain subsystems are described herein for ease of description, the memory 170 may include more or fewer subsystems to perform the functionality described herein.

The signal grouping subsystem 176 may receive data from the vehicle 105 and the IMU 140 and group the various signals into detection sets, such as the detection sets shown in FIG. 3. These subsets may, for example, be grouped based off of vehicle characteristics in order to identify an anomaly, such as through the anomaly detection shown in FIG. 4. The signals received may be grouped such that any one signal is in at least one different detection sets. For example, detection set 1 301, detection set 2 302, detection set 7 307, detection set 8 308, and detection set 9 309, as depicted in FIG. 3, each include the gas pedal position signal, as indicated by the checkmark in the gas column 331 and as will be described in more detail below.

The behavior model library 178 may have a database of normal vehicle behaviors. These normal vehicle behaviors may be statistics, logistics, benchmarks, or measurement values that are expected of a particular make and model of a vehicle when operating under non-anomalous circumstances. The normal vehicle behaviors may be vehicle models that are trained using a machine learning algorithm, for example, by linear or range regression. In embodiments, the OBD-II dongle 110 may be configured to generate a normal vehicle behavior model based off of data received from the vehicle 105. In embodiments, the behavior model library 178 may be stored in the vehicle memory 124.

The detection set library 180 may contain a database on groupings of various detection sets and serve as a memory storage of formed detection sets. The detection set library 180 may also contain a subset of data from the behavior model library 178 consisting of expected detection set values and behaviors for a non-anomalous vehicle.

The anomaly detection subsystem 174 takes detection sets and compares them to expected behaviors pulled from the behavior model library 178 and/or the detection set library 180. The comparison may be, in embodiments, by a distance from the normal model. In other embodiments, the detection may be by, for example, a detection in behavior changes in comparison to a test model based off of information pulled from the vehicle 105 through the sensors 118 of the on-board diagnostics II system 116. In some embodiments, the anomaly detection subsystem 174 may use a combination of the two, or any other suitable comparison to detect an anomaly.

The cross-referencing subsystem 172 may contain instructions on cross-referencing detection sets pulled from the signal grouping subsystem 176, subsequent to running the anomaly detection subsystem 174. Cross-referencing of the detection sets may be by a table-comparison of the results. Due to the grouping such that each signal is in at least one detection set, cross-referencing by comparison allows the OBD-II dongle 110 to identify the anomalous signal source as well as make data comparisons to ensure the anomaly is captured. In embodiments, the output of the cross-referencing subsystem 172 may be sent by the transceiver 150 to the vehicle 105 to send to reporting subsystem 130.

Thus, in operation, a user may set up an interface between the vehicle 105 and OBD-II dongle 110 in order to detect and identify any anomalies that may be occurring in the vehicle 105. The sensor data collection subsystem 126 may collect data from the sensors 118 and on-board diagnostics II system 116 and send them to the OBD-II dongle 110. After the data is sent to the OBD-II dongle 110, the processor 160 groups the data through the signal grouping subsystem 176, and runs comparisons through the anomaly detection subsystem 174 with the behavior model library 178 and the detection set library 180. The detection sets are then passed to the cross-referencing subsystem 172 to identify a source of the anomaly as well as verify the accuracy of the anomaly.

Figure 2:
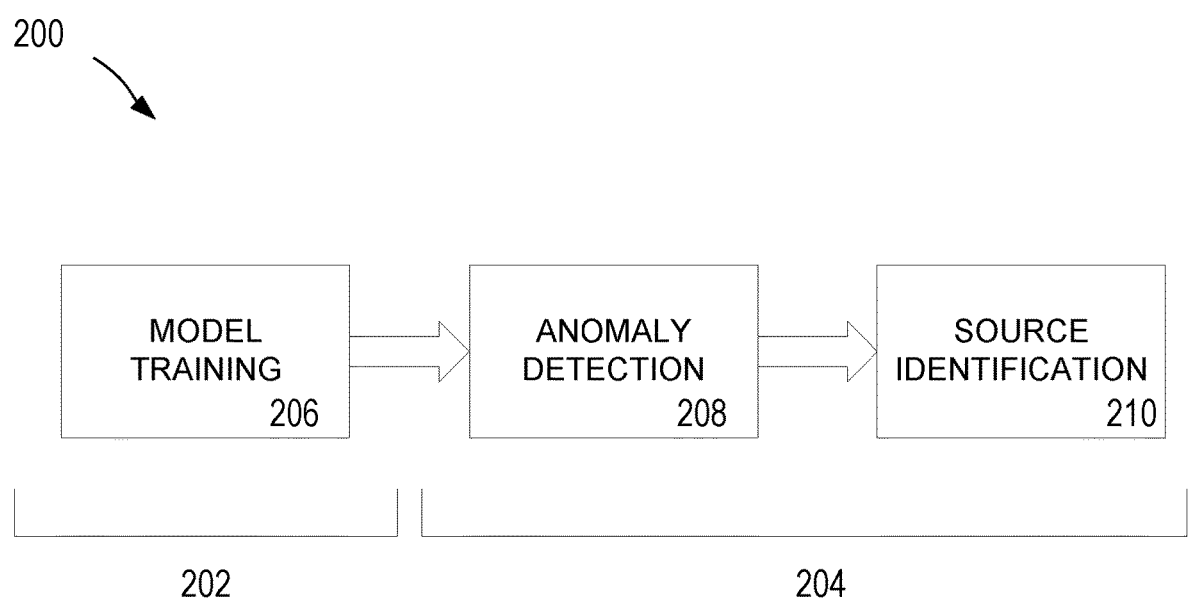
FIG. 2 illustrates a workflow for a system detecting and identifying a vehicular anomaly, according to embodiments.

FIG. 2 is a workflow flowchart 200 illustrating the general steps of detecting and diagnosing anomalies. The flowchart 200 has a training phase 202 and a diagnostic phase 204. The training phase 202 has a model training step 206. The diagnostic phase 204 has an anomaly detection step 208 and a source identification step 210.

In embodiments, the training phase 202 occurs externally to the vehicle. For example, a behavior model library, such as behavior model library 178, can be created through machine learning models based off of factory-line vehicles with preset specifications. In other embodiments, the training phase 202 can occur based on data acquired through the CAN bus through logistics acquired from communicatively coupling with the vehicle.

The diagnostic phase 204 can occur through an OBD II dongle, such as OBD-II dongle 110. The anomaly detection step 208 can occur through a signal grouping subsystem and an anomaly detection subsystem, such as the signal grouping subsystem 176 and the anomaly detection subsystem 174.

In anomaly detection, certain particulars may be examined in order to ensure proper vehicular control and maneuver is maintained. In assessing diagnostics related to vehicle maneuvers, the particular signals examined by, for example, the intelligence system 100, can be signals from the categories of control inputs (CI), powertrain components (PC), vehicle dynamics (DYN), or any other suitable sensor measurements acquired from the vehicle.

Signals measured in control inputs can include gas pedal position, brake position/torque, a steering wheel angle, or any other signals that may be captured based on inputs a user provides to control the vehicle. Signals measured in powertrain components can include engine rotations per minute (RPM) gear levels, flywheel torque, powertrain temperatures, or any other signals that may be captured by powertrain components during operation. Signals measured in vehicle dynamics can include longitudinal acceleration, latitudinal acceleration, speed, yaw rate, vector acceleration or any other signals that are related to the vehicle's dynamic movement. The signals can be measured by sensors of the vehicle, such as sensors 118, IMUs, such as IMU 140, or any other suitable measurement device.

FIG. 3 shows a table 300 of the above signals grouped into 12 different detection sets. As described above, each signal is present in at least one detection set to provide for easy cross-referencing and identification of an anomaly when an anomaly is detected. The table shows a checkmark for the signals present in each detection set. The leftmost column shows detection set 1 301, detection set 2 302, detection set 3 303, detection set 4 304, detection set 5 305, detection set 6 306, detection set 7 307, detection set 8 308, detection set 9 309, detection set 10 310, detection set 11 311, and detection set 12 312. The topmost row shows gas pedal position column 331, brake position/torque 332, steering wheel angle 333, engine rotations per minute 334, gear level 335, longitudinal acceleration 336, latitudinal acceleration 337, yaw rate 338, and speed 339.

In the embodiment shown, the first 3 detection sets, numbered 1-3, are a cross of signals between the control inputs 320 and the vehicle dynamics 324 in the longitudinal direction. Detection set 1 301 is a set with signals from the gas pedal position 331, the brake position/torque 332, the longitudinal acceleration 336, and the speed 339. Detection set 2 302 is a set with signals from the gas pedal position 331, the longitudinal acceleration 336 and the speed 339. Detection set 3 303 is the brake pedal position 332, the longitudinal acceleration 336 and the speed 339. These three detection sets capture the input-to-response consistency related to acceleration in the longitudinal direction.

In the embodiment shown, the second 3 detection sets, numbered 4-6, are a cross of signals between powertrain components 322 and vehicle dynamics 324. Detection set 4 304 is a set with signals from the engine rotations per minute 334, the gear level 335, and speed 339. Detection set 5 305 is a set with signals from the engine rotations per minute 334 and speed 339. Detection set 6 306 is a set with signals from the gear level 335 and speed 339. These three detection sets capture the relation between the output of powertrain components and their resulting vehicle dynamics.

In the embodiment shown, detection sets 7 and 8 are a cross of signals between the control inputs and powertrain components. Detection set 7 307 is a set with signals from the gas pedal position 331, the brake position/torque 332, and the engine rotations per minute 334. Detection set 8 308 is a set with signals from the gas pedal position 331, the brake position/torque 332, and the gear level 335. These two detection sets capture the control input interaction with the powertrain components.

In the embodiment shown, detection set 9 309 is a cross of signals from the control inputs, powertrain components, and vehicle dynamics. Detection set 9 309 is a set with signals from the gas pedal position 331, the gear level 335, and speed 339. This detection set models the automatic transmission's behavior by considering the vehicle data signals in all three categories.

In the embodiment shown, detection set 10 and 11 are a cross of signals between the control inputs and vehicle dynamics in the latitudinal direction. Detection set 10 310 is a set with signals from the steering wheel angle, the longitudinal acceleration, and speed. Detection set 11 311 is a set with signals from the steering wheel angle, the yaw rate, and the speed.

In the embodiment shown, detection set 12 312 is a cross of vehicle dynamics signals in the latitudinal direction. Detection set 12 312 is a set with signals from the latitudinal acceleration 337, the yaw rate 338, and speed 339. Together with detection sets 10 and 11, these three detection sets capture the latitudinal maneuver characteristics of steering control.

The detection set index on the left-hand side of the table indicates an asterisk for a strong detection set for signals that have a strong causal relation and are able to achieve better detection accuracy. The detection sets without an asterisk show detection sets with a weak causal relation that are accurate upon the occurrence of particular events.

Based on the detection sets and the vehicle maneuvering characteristics captured within each respective detection set, each detection sets overlapping signal points can be used for cross-validating and integrity verification.

In embodiments employing the above signals, the signals can be grouped into detection sets with other signals, such that each detection set captures a unique vehicle maneuver characteristic, and the signals in each detection set overlaps with other detection sets for the ability to cross-reference and verify accuracy of a reported anomaly.

Figure 4:
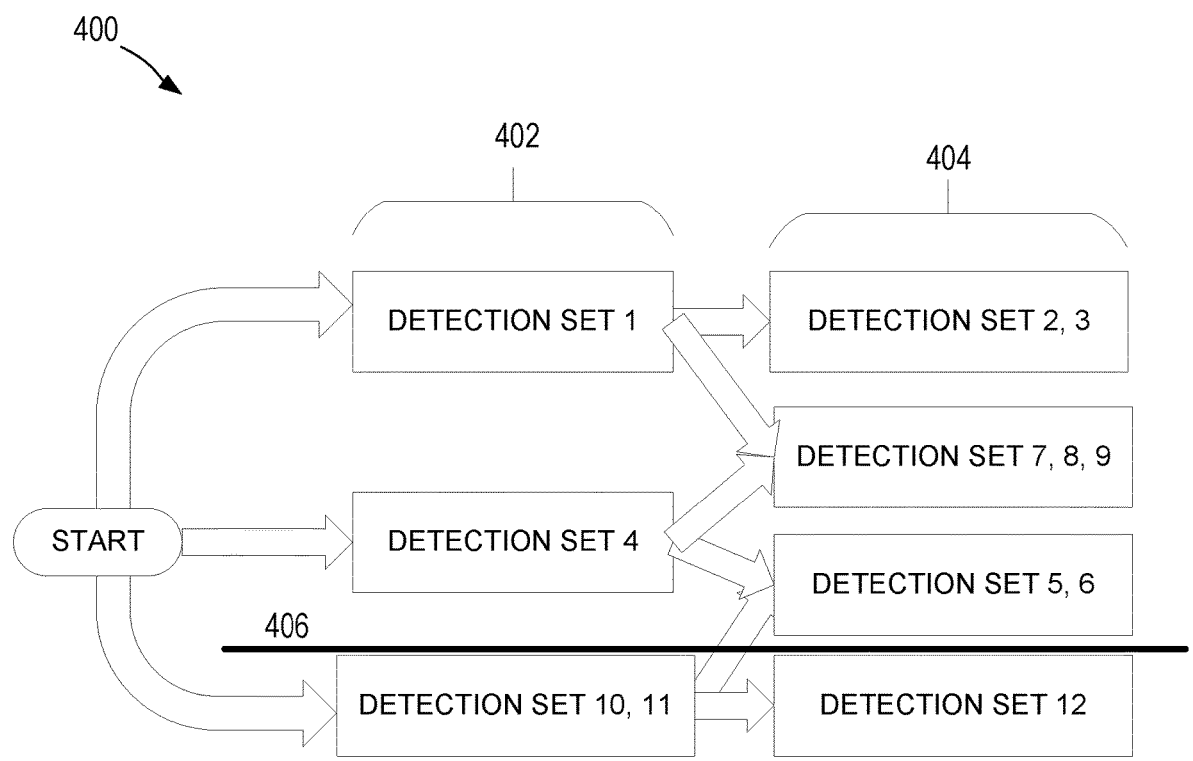
FIG. 4 illustrates a flowchart of a detection procedure, according to embodiments.

FIG. 4 is an illustration of a flowchart of an anomaly detection procedure 400, according to embodiments. The anomaly detection procedure 400 has 12 detection sets. The detection sets can be divided into strong detection sets 402 and weak detection sets 404 for anomaly detection and anomaly verification, respectively. By grouping the signal into detection sets, the anomaly detection can narrow down the source of an anomaly due to a more limited data set.

Furthermore, to minimize processing and computing power, the anomaly detection procedure can reduce the number of detection sets the system must check for at all times. In the anomaly detection procedure 400, the strong detection sets 402 are constantly being checked or are "always on." In the event that one of the strong detection sets of the strong detection sets 402 returns an anomaly, then the anomaly detection procedure proceeds to the corresponding connected weak detection set of the weak detection sets 404. Thus, for example, if detection set 1 registers an anomaly, then the anomaly detection procedure 400 proceeds forward to examining detection sets 2, 3, 7, 8, and 9.

The detection sets can be divided into longitudinal sets, geared towards capturing input-to-response consistency related to acceleration in the longitudinal direction and latitudinal sets, related to capturing latitudinal maneuvering characteristics of steering control. The horizontal line 406 represents the division between longitudinal detection sets and latitudinal detection sets; detection sets shown above the horizontal line 406 are related to longitudinal sets while detection sets shown below the horizontal line 406 are related to latitudinal sets Within the detection sets, a comparison can be made to a normal model. Detection by the distance of the measured values to the normal value can detect anomalies based off of a large deviation from the normal model. Detection can also be measured over a longer period of time by obtaining a test model based off of the current measurement values of each detection set and compare the parameters of the trained set to the normal model. By utilizing the two types of detection in combination, the system can detect both major and minor deviations due to anomalies.

The data can be compiled into a cross-reference table 500, as shown in FIG. 5 to help narrow and identify a source of the anomaly after the anomaly has been detected by using multiple detection sets. The table 500 may use corresponding detection sets as shown and discussed above in FIG. 3. Using the anomaly detection procedure 400 discussed above in FIG. 4, where detection set 1 501, detection set 4 502, detection set 10 503, and detection set 11 504 are always on can result in table 500. A faulty report in detection set 4 502 would lead to subsequent comparisons in detection set 5 505, detection set 6 506, detection set 7 507, detection set 8 508, and detection set 9 509 between the signal data and the model data.

After the comparisons are run, the results are compiled into table 500 to cross-reference each individual detection set with the individual measurement signals. The table shows a "1" for a pass value and a "0" for a fail value. An "OR" operation is run to produce the values in the "All" row 510. That is, for a component, the entire column cannot have a pass value to return a 0, and any pass value in the column will return a 1. The use of multiple detection sets allows for isolation and verification of the faulty component. Thus, for example, looking at the table, the common component that proves faulty across multiple detection sets is the gear level as the potential anomaly source.

When compiling these detection sets, a targeted attack proves difficult because the targeted attack, beyond just outputting false data, must accurately predict the behavior results across multiple detection sets as well as the response in relation to the normal behavior model. Due to the weak causal relation that signifies particular occurrences, the anomaly detection can account for malicious attacks that attempt to portray false data.

In embodiments, the cross-referencing may err on the side of safety for conflicting results or false negatives through the multiple detection sets. For example, if a comparison returns a fail for one detection set, but detection sets with overlapping signal data return a pass, the intelligence system may report the source as a potential anomaly.

FIG. 6 illustrates a method 600 for detecting and identifying anomalies within a vehicle. Method 600 can be performed by, for example, intelligence system 100 including vehicle 105 and OBD-II dongle 110, as described above with respect to FIG. 1.

At step 602, a plurality of signals from a plurality of sensors is received, with each of the plurality of signals containing vehicular data. For example, the plurality of sensors may be the sensors 118, the IMU 140, or any other suitable sensor measuring vehicular data. The signals may be, for example, the gas pedal position, the brake position/torque, the steering wheel angle, the engine RPM, the gear level, the longitudinal acceleration, the latitudinal acceleration, the speed, the yaw rate, or any other suitable vehicular data for diagnosing and detecting anomalies.

At step 604, the plurality of signals is grouped into a plurality of detection sets, with each signal of the plurality of signals included in at least one detection set. The grouping may be done by, for example, the signal grouping subsystem 176. The detection sets may be, for example, the detection sets outlined above and shown in FIG. 3.

At step 606, an anomaly is detected within at least one detection set of the plurality of detection sets based on a comparison of signals in the at least one detection set to a normal behavior model. The normal behavior model may be selected from a library, such as the normal behavior library 178 or the detection set library 180. The comparison may be done by an anomaly detection subsystem 174. The anomaly detection may follow a procedure as shown in anomaly detection procedure 400.

At step 608, the at least one detection set is cross-referenced with at least one other detection set of the plurality of detection sets to identify a source of the anomaly. For example, the cross-referencing may follow a similar format to that shown in the table of FIG. 5. The cross-referencing may be done by a cross-referencing subsystem, such as cross-referencing subsystem 172. In embodiments, the results of the cross-referencing may be reported to a user through a reporting subsystem, such as reporting subsystem 130.

Figure 7:
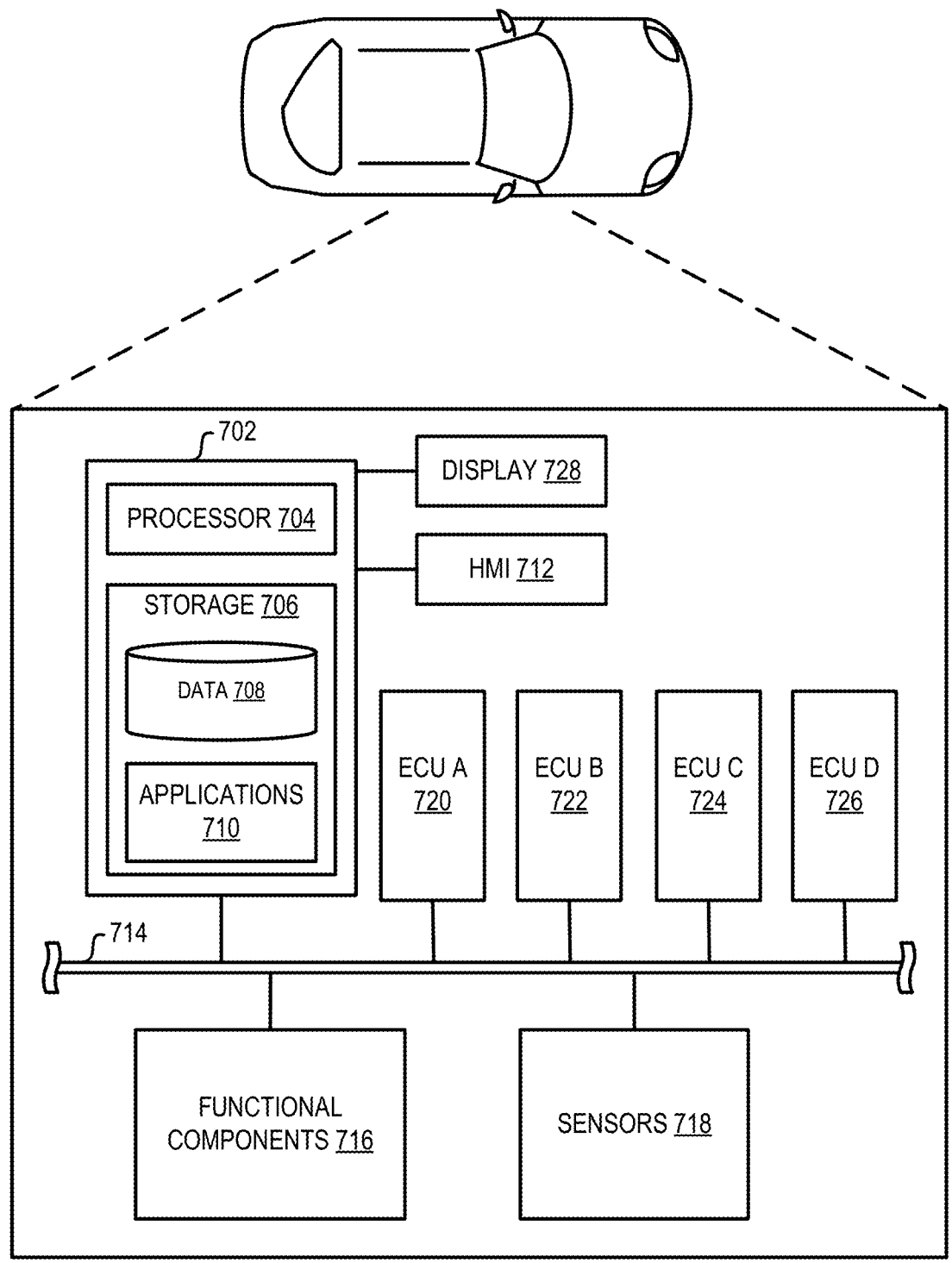
FIG. 7 illustrates a block diagram of a vehicle system, according to some embodiments.
Figure 8:
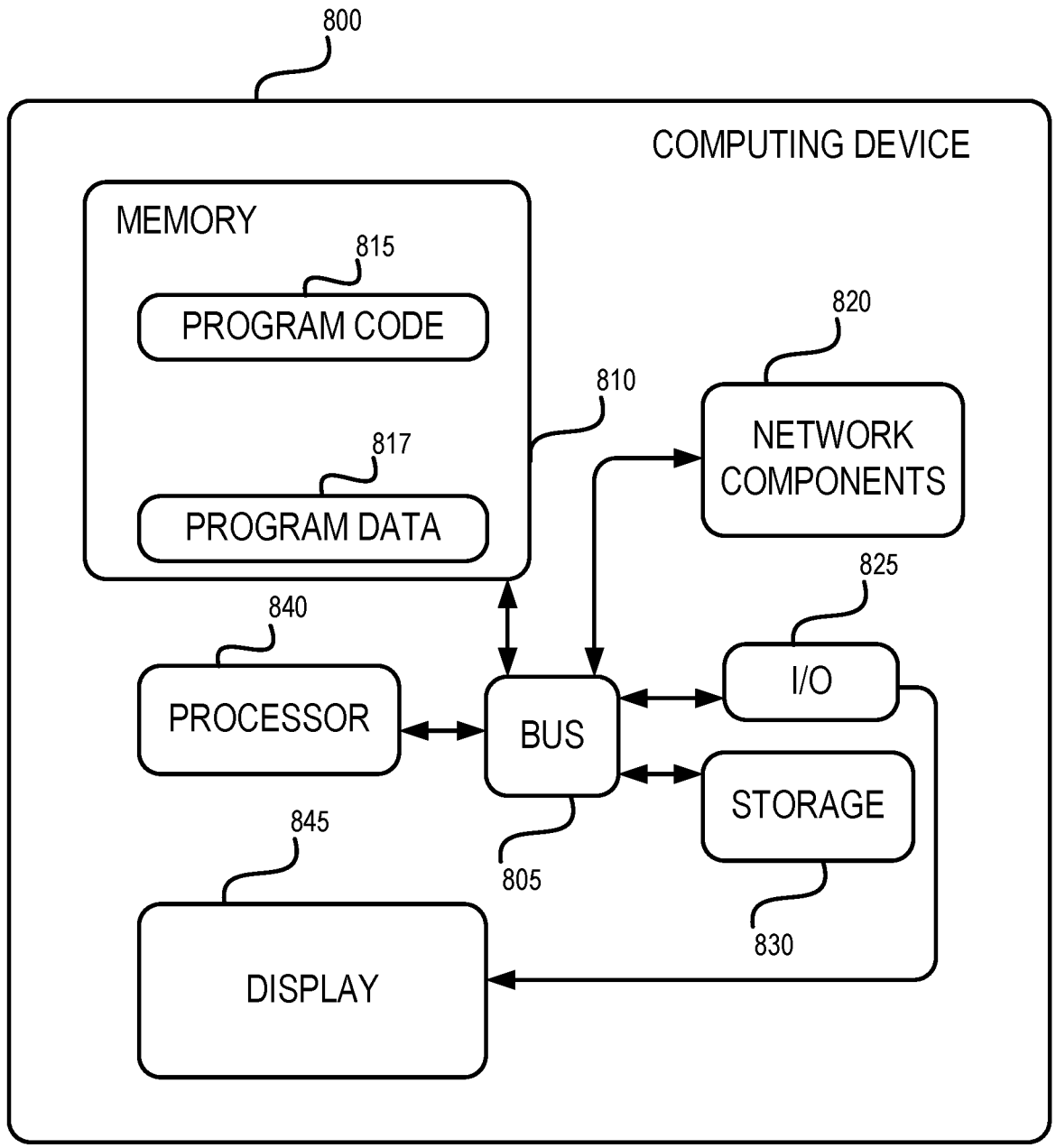
FIG. 8 illustrates a block diagram of a computing system, according to some embodiments.

Any suitable computing system or group of computing systems can be used for performing the operations or methods described herein. For example, FIG. 7 illustrates a vehicle system including a computing system 702 as well as multiple ECUs which may perform some or all of the functions described herein. FIG. 8 further depicts an example of a computing device 800 that may be at least a portion of computing system 702.

FIG. 7 illustrates a block diagram of a vehicle system 700, according to some embodiments. The vehicle system 700 may include a computing system 702 configured to communicate over an in-vehicle network 714. The computing system 702 includes a processor 704 and storage 706. While a vehicle system 700 is shown in FIG. 7, the example components as illustrated are not intended to be limiting. Indeed, the vehicle system 700 may have more or fewer components, and additional or alternative components and/or implementations may be used. It should be noted that the use of a vehicle system 700 environment is illustrative, as the functional safety measures and security measures may be utilized in other types of systems such as flight control system in an airplane, or a medical device or industrial machine.

The vehicle system 700 may include various types of automobile, crossover utility vehicle (CUV), sport utility vehicle (SUV), truck, recreational vehicle (RV), boat, plane or other mobile machine for transporting people or goods. In many cases, the vehicle system 700 may be powered by an internal combustion engine. As another possibility, the vehicle system 700 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 700 may vary, the capabilities of the vehicle system may correspondingly vary. As some other possibilities, vehicle system 700 may have different capabilities with respect to passenger capacity, towing ability and capacity, and storage volume.

The computing system 702 may include a Human Machine Interface (HMI) 712 and a display 728 for user interaction with the computing system 702. An example computing system 702 may be the SYNC™ system provided by FORD MOTOR COMPANY™ of Dearborn, Michigan In some examples the display 728 may include a vehicle infotainment system including one or more displays. The HMI 712 may be configured to support voice command and BLUETOOTH™ interfaces with the driver and driver carry-on devices, receive user input via various buttons or other controls, and provide vehicle status information to a driver or other vehicle system 700 occupants. For instance, the computing system 702 may interface with one or more buttons or other HMI 712 configured to invoke functions on the computing system 702 (e.g., steering wheel audio buttons, a push-to-talk button, instrument panel controls, etc.). The computing system 702 may also drive or otherwise communicate with the display 728 configured to provide visual output to vehicle occupants, e.g., by way of a video controller. In some cases, the display 728 may be a touch screen further configured to receive user touch input via the video controller, while in other cases the display 728 may be a display only, without touch input capabilities. In an example, the display 728 may be a head unit display included in a center console area of the vehicle system 700. In another example, the display 728 may be a screen of a gauge cluster of the vehicle system 700.

The computing system 702 may further include various types of computing apparatus in support of performance of the functions of the computing system 702 described herein. In an example, the computing system 702 may include one or more processors 704 configured to execute computer instructions, and a storage 706 medium on which computer-executable instructions and/or data may be maintained. A computer-readable medium (also referred to as a processor-readable medium or storage 706) includes any non-transitory (e.g., tangible) medium that participates in providing data (e.g., instructions) that may be read by a computer (e.g., by the one or more processors 704). In general, the processor 704 receives instructions and/or data, e.g., from the storage 706, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 706 may include divisions for data 708 and applications 710. The data 708 may store information such as databases and other such information. The applications 710 may store the computer-executable instructions or other such instructions executable by the processor 704.

The computing system 702 may be configured to communicate with mobile devices of the vehicle system 700 occupants. The mobile devices may be any of various types of portable computing device, such as cellular phones, tablet computers, smart watches, laptop computers, portable music players, or other devices capable of communication with the computing system 702. As with the computing system 702, the mobile device may include one or more processors configured to execute computer instructions, and a storage medium on which the computer-executable instructions and/or data may be maintained. In some examples, the computing system 702 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternatively, the computing system 702 may communicate with the mobile device over a wired connection, such as via a USB connection between the mobile device and a Universal Serial Bus (USB) subsystem of the computing system 702.

The computing system 702 may be further configured to communicate with other components of the vehicle system 700 via one or more in-vehicle networks 714. The in-vehicle networks 714 may include one or more of a vehicle controller area network (CAN), an Ethernet network, or a media oriented system transfer (MOST), as some examples. The in-vehicle networks 714 may allow the computing system 702 to communicate with other units of the vehicle system 700, such as ECU A 720, ECU B 722, ECU C 724, and ECU D 726. The ECUs 720, 722, 724, and 726 may include various electrical or electromechanical systems of the vehicle system 700 or control various subsystems of the vehicle system 700. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 700); a radio transceiver module configured to communicate with key fobs or other vehicle system 700 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 700 location and heading information, and various other vehicle ECUs configured to corporate with the computing system 702. The subsystems controlled by the various ECUs may include functional components 716 of the vehicle system 700 including elements such as the powertrain, engine, brakes, lights, steering components, and the like. Additionally, some or all of the functional components 716 may include sensors 718 as well as additional sensors equipped to the vehicle system 700 for detecting various states, positions, proximity, temperature, and the like of the vehicle system 700 and subsystems thereof. The ECUs 720, 722, 724, 726 may communicate with the computing system 702 as well as the functional components 716 and the sensors 718 over the in-vehicle network 714. While only four ECUs are depicted in FIG. 7, any number (more or fewer) of ECUs may be included in vehicle system 700.

FIG. 8 illustrates a block diagram of an example of a computing device 800. Computing device 800 can be any of the described computers herein including, for example, computing system 702 within the vehicle system 700 of FIG. 7 as well as ECUs 720, 722, 724, 726. The computing device 800 can be or include, for example, an integrated computer, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments logic flowchart described with respect to FIG. 1 above. The program code 815 may be resident in the memory 810 or any suitable computer-readable medium and may be executed by the processor 840 or any other suitable processor.

The computing device 800 may generate or receive program data 817 by virtue of executing the program code 815. For example, sensor data, trip counter, authenticated messages, trip flags, and other data described herein are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a computing device 800 with a processor 840, the system can include any number of computing devices 800 and any number of processor 840. For example, multiple computing devices 800 or multiple processor 840 can be distributed over a wired or wireless network (e.g., a Wide Area Network, Local Area Network, or the Internet). The multiple computing devices 800 or multiple processor 840 can perform any of the steps of the present disclosure individually or in coordination with one another.

Figure 9:
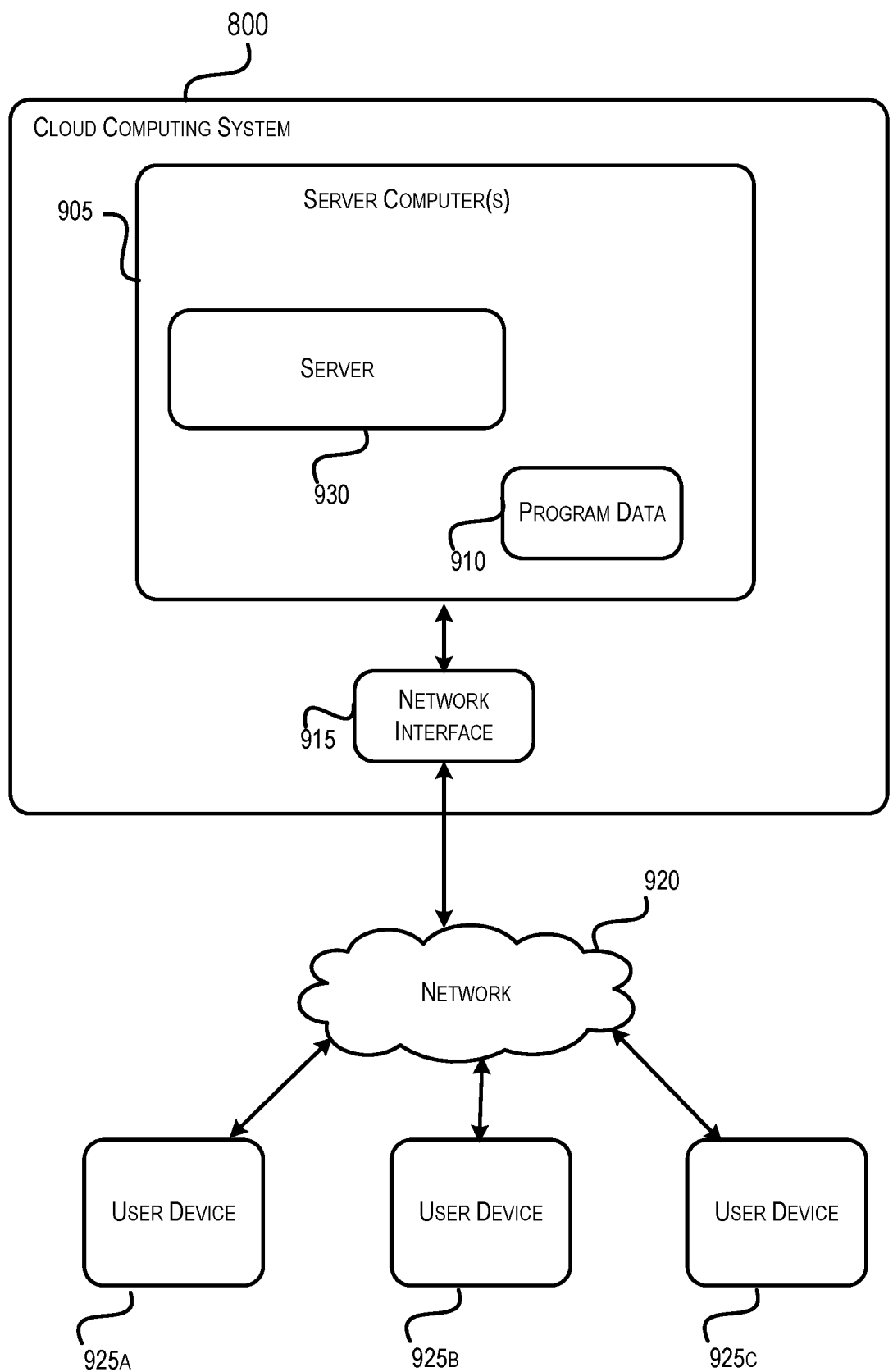
FIG. 9 illustrates a cloud computing system, according to some embodiments.

In some embodiments, the functionality provided by the computing device 800 may be offered as cloud services by a cloud service provider. For example, FIG. 9 depicts an example of a cloud computing system 900 offering an intelligence service that can be used by a number of user subscribers using user devices 925a, 925b, and 925c across a data network 920. User devices 925a, 925b, and 925c could be examples of a vehicle system 700 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 905.

The remote server computers 905 include any suitable non-transitory computer-readable medium for storing program code (e.g., server 930) and program data 910, or both, which is used by the cloud computing system 900 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 905 can include volatile memory, non-volatile memory, or a combination thereof.

One or more of the server computers 905 execute the program data 910 that configures one or more processors of the server computers 905 to perform one or more of the operations that determine locations for interactive elements and operate the adaptive rule-based system. As depicted in the embodiment in FIG. 9, the one or more server computers 905 provide the services to perform the adaptive rule-based system via the server 930. Any other suitable systems or subsystems that perform one or more operations described herein (e.g., one or more development systems for configuring an interactive user interface) can also be implemented by the cloud computing system 900.

In certain embodiments, the cloud computing system 900 may implement the services by executing program code and/or using program data 910, which may be resident in a memory device of the server computers 905 or any suitable computer-readable medium and may be executed by the processors of the server computers 905 or any other suitable processor.

In some embodiments, the program data 910 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 920.

The cloud computing system 900 also includes a network interface device 915 that enable communications to and from cloud computing system 900. In certain embodiments, the network interface device 915 includes any device or group of devices suitable for establishing a wired or wireless data connection to the data networks 920. Non-limiting examples of the network interface device 915 include an Ethernet network adapter, a modem, and/or the like. The server 930 is able to communicate with the user devices 925*a*, 925*b*, and 925*c* via the data network 920 using the network interface device 915.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for detecting and diagnosing vehicle anomalies comprising:
    a plurality of sensors measuring vehicular data of a vehicle;
    one or more processors;
    a system memory, the system memory storing instructions to cause the one or more processors to:
        receive a plurality of signals from the plurality of sensors via a controller area network (CAN) bus of the vehicle, each signal of the plurality of signals containing the vehicular data of the vehicle;
        during a training phase:
            train a machine learning model using the vehicular data obtained via the CAN bus of the vehicle during normal functioning of the vehicle;
            generate a normal behavior model based on the trained machine learning model;
        during a diagnostic phase:
            group the plurality of signals into a plurality of detection sets, wherein each signal of the plurality of signals is included in at least one detection set of the plurality of detection sets, wherein at least one signal is present in at least two detection sets;

divide the plurality of detection sets into a first detection group including a first detection set and a second detection set among the plurality of detection sets and a second detection group including remaining detection sets in the plurality of detection sets;

continuously monitor the first detection group;

detect an anomaly within at least one detection set of the first detection group based on a comparison of signals in the first detection group to the normal behavior model;

cross-reference the at least one detection set of the first detection group with at least one other detection set of the second detection group to identify a source of the anomaly by:
identifying a signal type of the anomaly and corresponding to signals of the plurality of signals included in the at least one detection set;
selecting, among the second detection group, the at least one other detection set, wherein each detection set of the at least one other detection set includes one or more signals of the plurality of signals having the signal type; and
identifying, based on pass or fail cross-reference results of the at least one other detection set, that the anomaly is caused by a component failure when the one or more signals of the plurality of signals having the signal type of the anomaly in the at least one other detection set also exhibit the anomaly;
identifying, based on the pass or fail cross-reference results of the at least one other detection set, that the anomaly is caused by a targeted malicious data manipulation attack when the one or more signals of the plurality of signals having the signal type of the anomaly in the at least one other detection set do not exhibit the anomaly; and output the source of anomaly.

2. The system of claim 1 further comprising an on-board diagnostics system.

3. The system of claim 1 wherein at least one sensor of the plurality of sensors comprises an inertial measurement unit.

4. The system of claim 1, wherein the first detection group is designed to capture one or more vehicle maneuver characteristics and the remaining detection sets in the plurality of detection sets are designed for cross-validation of the first detection group.

5. The system of claim 1, wherein the plurality of signals comprise vehicle control input values, powertrain values, and vehicle dynamic values.

6. The system of claim 1, wherein the vehicular data is one or more of: gas pedal position, brake position, steering wheel angle, engine rotations per minute, gear level, longitudinal acceleration, latitudinal acceleration, speed, or yaw rate.

7. The system of claim 1 wherein the detection of the anomaly is by a derived distance from the normal behavior model.

8. The system of claim 1, wherein a first set of signals in the first detection set is mutually exclusive with a second set of signals in the second detection set.

9. A method for detecting and diagnosing vehicle anomalies comprising:

receiving, by a processor, a plurality of signals from a plurality of sensors via a controller area network (CAN) bus of a vehicle, each signal of the plurality of signals containing vehicular data of the vehicle;

during a training phase:
training a machine learning model using the vehicular data obtained via the CAN bus of the vehicle during normal functioning of the vehicle;
generating a normal behavior model based on the trained machine learning model;

during a diagnostic phase:
grouping, by the processor, the plurality of signals into a plurality of detection sets, wherein each signal of the plurality of signals is included in at least one of the plurality of detection sets, wherein at least one signal is present in at least two detection sets;
dividing the plurality of detection sets into a first detection group including a first detection set and a second detection set among the plurality of detection sets and a second detection group including remaining detection sets in the plurality of detection sets;
continuously monitoring the first detection group;
detecting, by the processor, an anomaly within at least one detection set of the first detection group based on a comparison of signals in the first detection group to the normal behavior model;
cross-referencing, by the processor, the at least one detection set of the first detection group with at least one other detection set of the second detection group to identify a source of the anomaly by:
identifying a signal type of the anomaly and corresponding to signals of the plurality of signals included in the at least one detection set;
selecting, among the second detection group, the at least one other detection set, wherein each detection set of the at least one other detection set includes one or more signals of the plurality of signals having the signal type; and
identifying, based on pass or fail cross-reference results of the at least one other detection set, that the anomaly is caused by a component failure when the one or more signals of the plurality of signals having the signal type of the anomaly in the at least one other detection set also exhibit the anomaly;
identifying, based on the pass or fail cross-reference results of the at least one other detection set, that the anomaly is caused by a targeted malicious data manipulation attack when the one or more signals of the plurality of signals having the signal type of the anomaly in the at least one other detection set do not exhibit the anomaly; and
outputting the source of anomaly.

10. The method of claim 9, wherein the first detection group is designed to capture one or more vehicle maneuver characteristics and the remaining detection sets in the plurality of detection sets are designed for cross-validation of the first detection group.

11. The method of claim 9, wherein the plurality of signals comprise vehicle control input values, powertrain values, and vehicle dynamic values.

12. The method of claim 9, further comprising reporting the identified source of the anomaly.

13. The method of claim 9, wherein the vehicular data is one or more of: gas pedal position, brake position, steering wheel angle, engine rotations per minute, gear level, longitudinal acceleration, latitudinal acceleration, speed, or yaw rate.

14. A non-transitory, computer-readable medium comprising instructions that, upon execution by one or more processors, cause the one or more processors to:
receive a plurality of signals from a plurality of sensors via a controller area network (CAN) bus of a vehicle, each signal of the plurality of signals containing vehicular data of the vehicle;
during a training phase:
train a machine learning model using the vehicular data obtained via the CAN bus of the vehicle during normal functioning of the vehicle;
generate a normal behavior model based on the trained machine learning model;
during a diagnostic phase:
group the plurality of signals into a plurality of detection sets, wherein each signal of the plurality of signals is included in at least two of the plurality of detection sets, wherein at least one signal is present in at least two detection sets;
divide the plurality of detection sets into a first detection group including a first detection set and a second detection set among the plurality of detection sets and a second detection group including remaining detection sets in the plurality of detection sets;
continuously monitor the first detection group;
detect an anomaly within at least one detection set of the first detection group based on a comparison of signals in the first detection group to the normal behavior model;
cross-reference the at least one detection set of the first detection group with at least one other detection set of the second detection group to identify a source of the anomaly by:

identifying a signal type of the anomaly and corresponding to signals of the plurality of signals included in the at least one detection set;

selecting, among the second detection group, the at least one other detection set, wherein each detection set of the at least one other detection set includes one or more signals of the plurality of signals having the signal type; and identifying, based on pass or fail cross-reference results of the at least one other detection set, that the anomaly is caused by a component failure when the one or more signals of the plurality of signals having the signal type of the anomaly in the at least one other detection set also exhibit the anomaly;

identifying, based on the pass or fail cross-reference results of the at least one other detection set, that the anomaly is caused by a targeted malicious data manipulation attack when the one or more signals of the plurality of signals having the signal type of the anomaly in the at least one other detection set do not exhibit the anomaly; and output the source of anomaly.

15. The non-transitory, computer-readable medium of claim 14 comprising further instructions that, upon execution by the one or more processors, cause the one or more processors to communicatively couple to an on-board diagnostics system.

16. The method of claim 9, wherein a first set of signals in the first detection set is mutually exclusive with a second set of signals in the second detection set.

* * * * *